United States Patent
Deschamps et al.

[11] Patent Number: 5,303,894
[45] Date of Patent: Apr. 19, 1994

[54] ELECTRICAL FIXTURE HANGER

[75] Inventors: Bernard F. Deschamps; Henry J. Macuga, both of Ware, Mass.; Stuart S. Cox, Tallahassee, Fla.

[73] Assignee: Eclipse Manufacturing, Inc., Ware, Mass.

[21] Appl. No.: 889,921

[22] Filed: Jun. 2, 1992

[51] Int. Cl.⁵ ............................................. H02G 3/08
[52] U.S. Cl. ...................... 248/343; 248/906; 411/433
[58] Field of Search ............... 248/342, 343, 344, 906; 220/3.2, 3.9, 3.92, 3.7, 3.8; 411/433, 267, 270

[56] References Cited

U.S. PATENT DOCUMENTS

| | | | |
|---|---|---|---|
| 929,097 | 7/1909 | Lutz et al. | 220/3.8 |
| 2,140,861 | 12/1938 | Steketee | 248/906 X |
| 2,809,002 | 10/1957 | Rudolph | 248/906 X |
| 4,023,697 | 5/1977 | Marrero | 220/3.92 X |
| 4,050,603 | 9/1977 | Harris et al. | 248/906 X |
| 4,295,575 | 10/1981 | Flachbarth | 220/3.92 |
| 4,518,141 | 5/1985 | Parkin | 248/906 X |
| 4,909,405 | 3/1990 | Kerr, Jr. | 248/906 X |
| 4,954,032 | 9/1990 | Morales | 411/433 X |
| 5,118,237 | 6/1992 | Wright | 411/433 |
| 5,150,868 | 9/1992 | Kaden | 248/343 |

FOREIGN PATENT DOCUMENTS 1475335  2/1967  France .................... 220/3.8

Primary Examiner—Ramon O. Ramirez
Attorney, Agent, or Firm—Mason, Fenwick & Lawrence

[57] ABSTRACT

A two part tubular wall or ceiling hanger mounted behind the same having means to determine the correct height from wall or ceiling and carriage bolts to fit square holes for easier assembly of the hanger plate or pan.

6 Claims, 3 Drawing Sheets

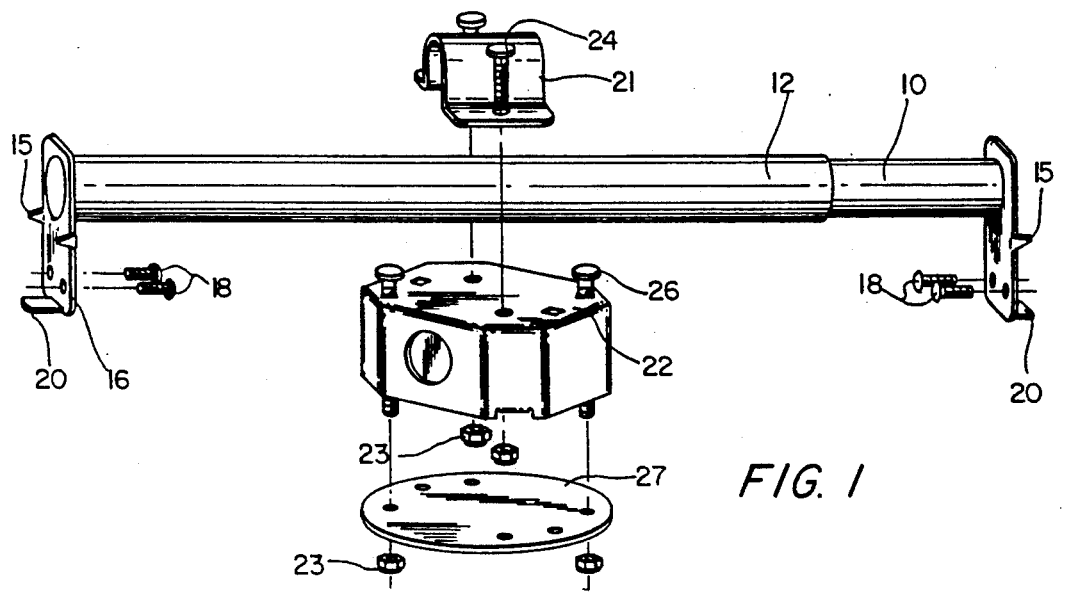
FIG. 1
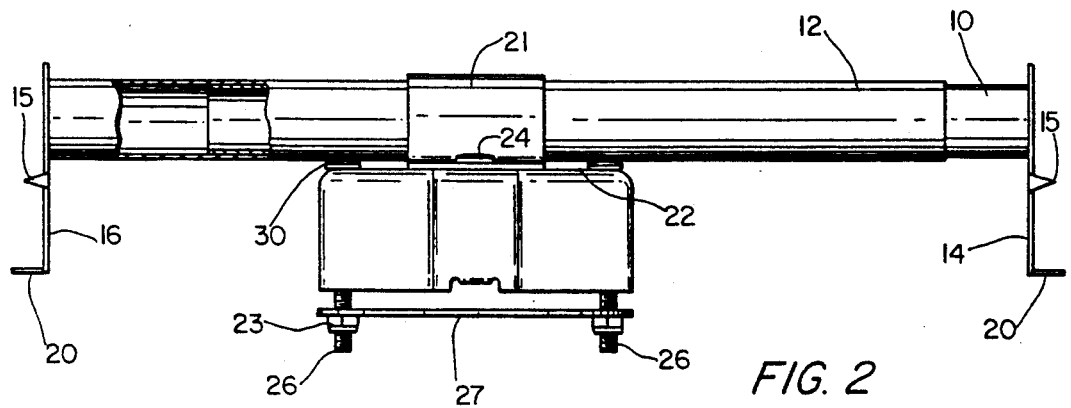
FIG. 2
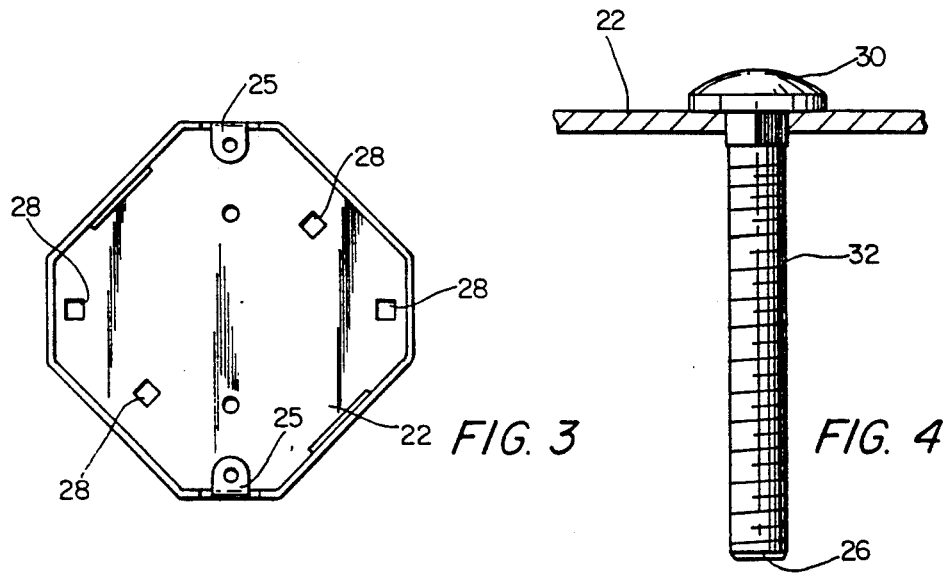
FIG. 3
FIG. 4

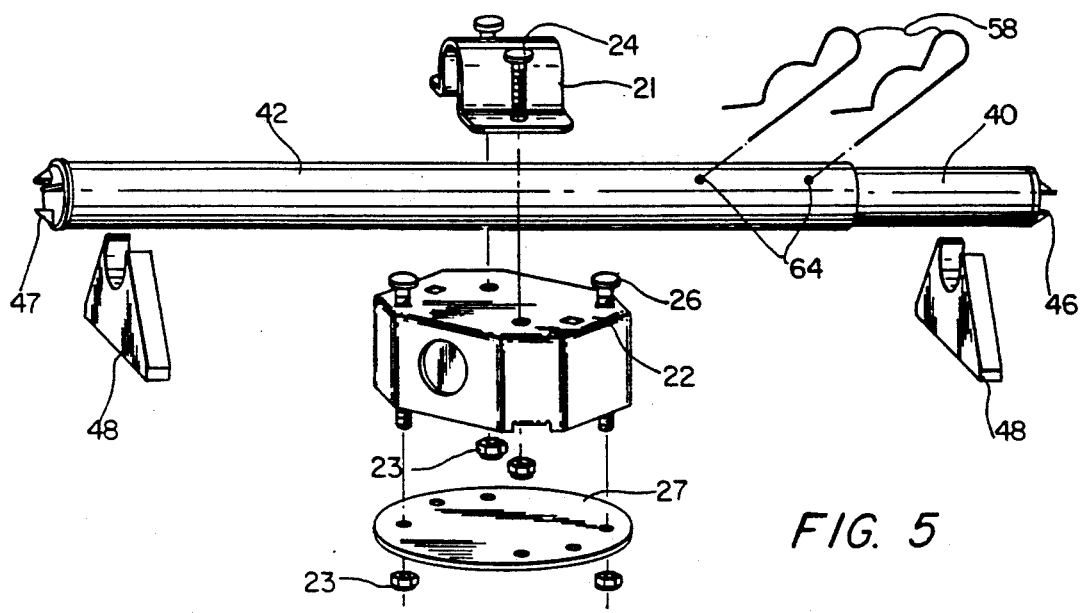
FIG. 5
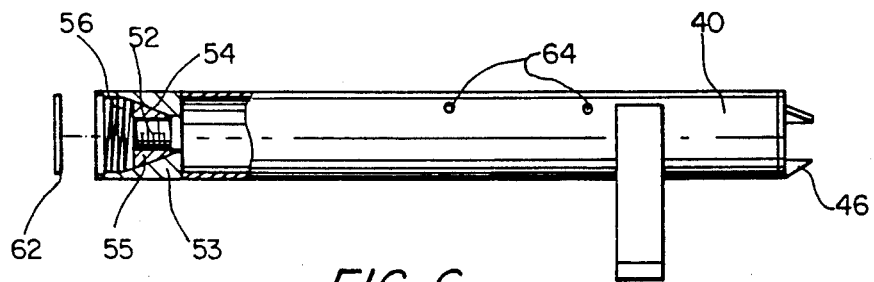
FIG. 6
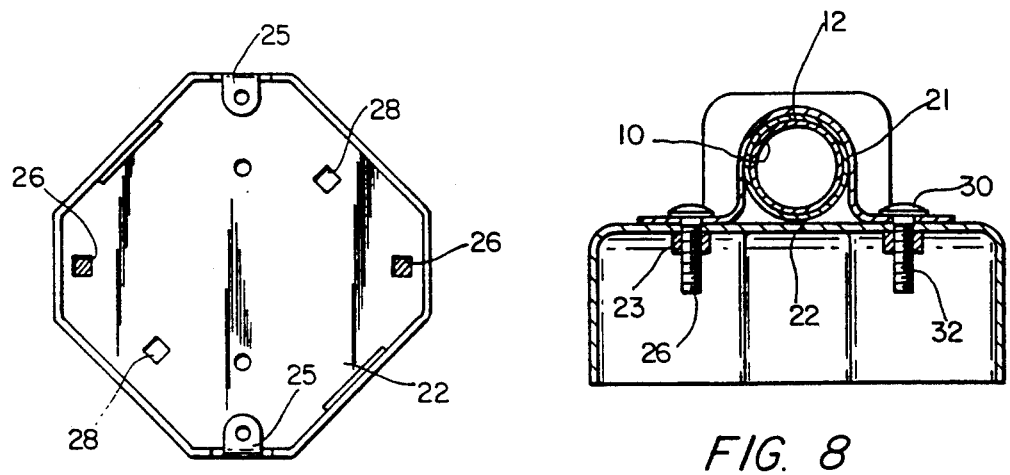
FIG. 7
FIG. 8 ance "ELECTRICAL FIXTURE HANGER"

BACKGROUND OF THE INVENTION

Hangers for ceiling and wall mounted objects are designed to safely support such awkwardly handled objects as ceiling fans and the like by concealed means, and the more securely this can be done with the easiest method and most inexpense for the security, etc. obtained is very desirable. This invention presents three models very much alike, but one being for a structure wherein the ceiling is not yet assembled and two for a situation wherein the ceiling or wall must be penetrated.

SUMMARY OF THE INVENTION

In a first embodiment of the invention, a pair of telescopic tubes are operated by hand to locate the ends of the tubes reaching across to join the two adjacent forms. Flat cross plates at the ends of the tubes locate the hanger by means of out-turned lips that underlie the adjacent forms, and screws are then used to permanently put the hanger in place. This model is best used in an open ceiling.

A second embodiment is best used when it is necessary to work through a hole in the ceiling. Similar tubes are used but these tubes have an interconnecting thread to force the tubes apart and into a connection with the adjacent forms by sharp points on the ends of the tubes and small laterally adjustable stands on each tube which set the hanger at the right height at the inner side of the ceiling.

A third embodiment utilizes the combination of an interconnecting buttress threaded rod and a spring to instantly expand the tubes out to meet the adjacent forms. The tubes are prevented from expanding during shipping and installation by means of safety clip(s) which are removed after the tubes are inserted through the ceiling hole and aligned perpendicular to the adjacent forms.

An electric box used in all three embodiments of the invention is secured to the outermost tube and this box has four untapped non-circular holes in its top to accept carriage bolts to which the plate and the object to be hung are fastened with ease because the bolts in the top of the box are rigidly fixed and also cannot rotate. The box top also has a non-circular knockout in it.

BRIEF DESCRIPTION OF THE DRAWINGS

FIG. 1 is an exploded view of the first embodiment of the Hanger;

FIG. 2 is an elevational view of the Hanger of FIG. 1, part in section;

FIG. 3 is a view of the electrical box;

FIG. 4 is an enlarged detail of the square hole and carriage bolt;

FIG. 5 is an exploded view of the third embodiment of the invention;

FIG. 6 is an elevational view of the third embodiment of the invention, part in section;

FIG. 7 is a view like FIG. 3 but showing the carriage bolts in section; and p FIG. 8 is a section of the electrical box;

PREFERRED EMBODIMENT OF THE INVENTION

Figure 9:
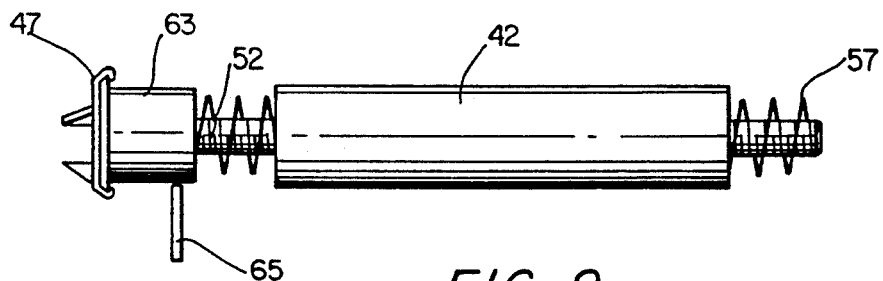
FIG. 9 is an exploded view of the second embodiment of the invention.

FIGS. 1 and 2, illustrating the first embodiment of the invention, show telescoping tubes indicated at 10 and 12, with nothing in the tubes to hold them in position. At both ends of the combined tubes are flat plates 14 and 16 affixed there and at right angles to the lengths of the tubes. Initially one end plate is hammered into position, between wooden members (studs, joists, rafters) and wood screws such as at 18 are installed through the flat plate into the adjacent wooden members (not shown). This process is repeated with the opposite end. Each plate has at its lower edge an out-turned lip 20 to place under the joist, to ensure correct placement of the hanger. Thus, the hanger is very easy to utilize in an open ceiling structure by holding it in place with the lips 20 up against the joists with one hand, hammering in the spikes 15 to temporarily secure the end before securing with wood screws through plate 14, 16 apertures. This device may also be used in an above-the-ceiling (attic) installation with tabs broken off, bent back, or slid under the joist if clearance is enough. In either case, the bottom edge of plate 16,14 provides the correct spacing for the outlet box.

As shown in FIGS. 3, 7, and 8, electric box 22 is held to the strap plate 21 riding over the larger tube by carriage bolts 24 and locknuts 23. After the electrical work is done, the bottom of the box, which is open, is closed by carriage bolts 26 fastening a plate or pan 27 in turn having bolt holes for securing the object to be held. The top of the box is provided with non-circular holes 28 to receive long carriage bolts 26, see especially FIG. 4. The box bolt hole positioning allows carriage bolt heads 30 to be captured under the tube or strap to prevent their being pushed up out of the holes during plate installation. The top of the box 22 has the non-circular holes at 45 and 90 degrees to the "ears" 25 of the box to allow for different size brackets and four point mounting of heavy light fixtures as well as providing direct linear support directly under the tubes. The carriage bolts 26 have non-circular portions as usual to fit the non-circular holes and prevent rotation of the bolts for easier application of nuts from below the plate or pan. The carriage bolts have rounded heads 30 and threads 32.

The height position is determined by the bottom edges 48 of laterally adjustable solid stands 48 snapped-on and cradling the tubes while resting on the ceiling, and adjustable for clearing debris found remaining in the ceiling, especially lath ceilings.

The second and third embodiments of the invention are more easily installed than the first embodiment when working through a small hole in the ceiling.

Figure 10:
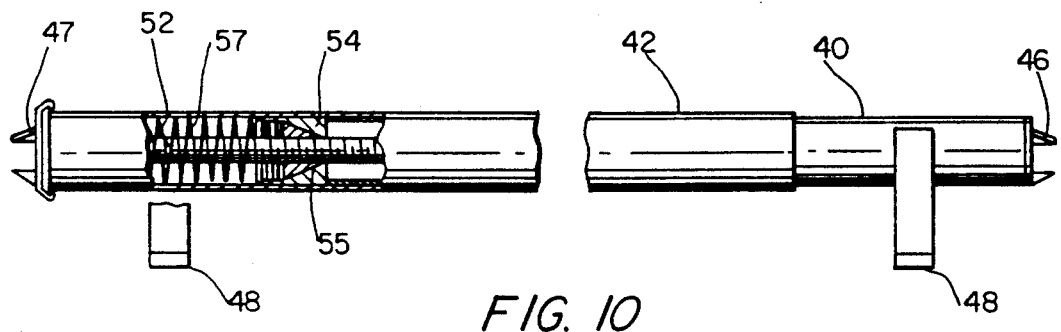
FIG. 10 is an elevational view of the second embodiment of the invention, part in section.
Figure 11:
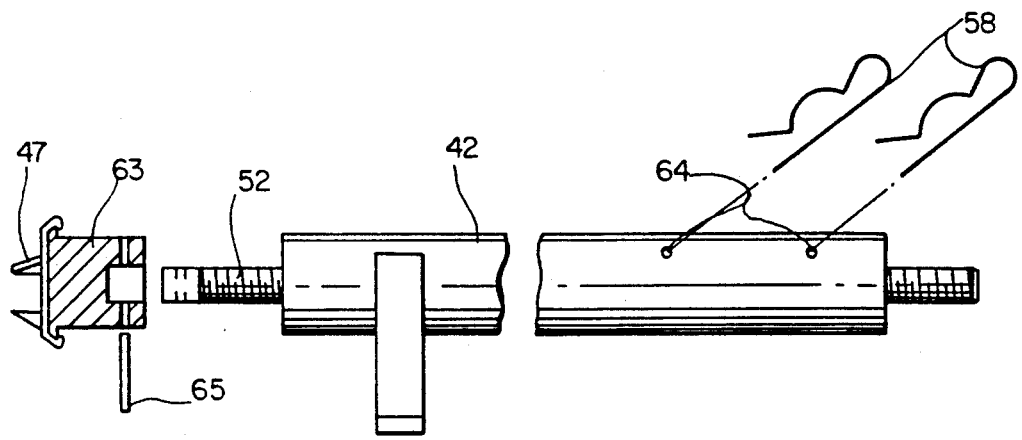
FIG. 11 is an elevational view of the second embodiment of the invention.

As shown in FIGS. 9, 10, and 11, the second embodiment includes tubes 40, 42 which are like tubes 10, 12 except that they have spikes 46, 47 instead of flat plates 16 and there is a screw mechanism to expand the total length. Interconnecting buttress threaded rod 52 is attached to end plug 63 with roll pin 65. Threaded rod 52 is then inserted into outer tube 42 and end plug 63 is pressed in place. This leaves buttress threaded rod 52 inside outer tube 42 and unable to rotate inside outer tube 42. The matching end of inner tube 40 has a conical seat 53 (shown in FIG. 6 in relation to the third embodiment, discussed in detail below) that fits the conical shape of the two buttress thread half nuts 54, 55, and spring 57 pushes the half nuts 54, 55 into conical seat 3. The second embodiment includes a retainer (not shown) which holds spring 57 in place. Alternatively, the spring can be held in place by a fender washer 62, as shown in FIG. 6 and described in relation to the third embodiment, discussed in detail below. When tube 42 is pulled away from tube 40, buttress half nuts 54,55 compress spring 57 allowing half nuts 54, 55 to separate within conical seat 53. This is facilitated by the angled surface of the buttress thread. As half nuts 54, 55 separate, buttress threaded rod 52 pulls through the half nuts 54, 55. This embodiment would be supplied with tube 40 screwed into tube 42 as far as possible. The hanger is placed through a hole in the ceiling or wall, not shown, and placed between adjacent forms, not shown, and two tubes manually pulled apart until the spikes 46 contact one adjacent form. Outer tube 42 is then rotated manually to exert enough pressure to force spikes 46, 47 completely into adjacent forms. Spikes 46, 47 are free to rotate on tube 42, allowing spikes 46, 47 to enter second adjacent form straight as tube 42 rotates. The pressure from rotation forces buttress half nuts 54, 55 into the conical seat 53, locking the buttress half nuts 54, 55 together and making them act as any tapped nut.

As shown in FIGS. 5 and 6, the third embodiment includes an interconnecting buttress threaded rod 52 which utilizes a buttress thread together with buttress half nut, 54 and 55, allowing for instant lateral expansion of the two tubes by means of a spring 56 captured inside the outer tube between fender washer 62 and end plug 63 (shown in FIGS. 9 and 11 in relation to the second embodiment, discussed above). The removal of one or several safety pins 58 from corresponding holes 64 punched in both tubes 42 and 40 releases the spring's tension, driving the tubes away from each other and towards the adjacent forms. In this embodiment, the stands 48 again snap onto the tubes but are slightly larger than the corresponding tubes to allow for the fast lateral movement of the tube when the spring tension is released. The tightening of the tubes 40, 42 to secure the spikes 46, 47 into the joists remains the same as in the second embodiment.

The construction and operation of the second and third embodiments are the same as the first; same box, same carriage bolts 26, etc.

We claim:

1. A hanger assembly for an object to be mounted from a ceiling or wall, comprising:
    a pair of freely slidable inner and outer telescope tubes, each tube having an outer end;
    a pair of parallel end plates transverse to the axis of the tubes and attached to the outer ends of the tubes, each end plate having an edge, spikes for hammering in the end plate, and an out-turned lip at the edge of the end plate and transverse to the end plate for positioning the hanger by placing the out-turned lip in an adjacent joint edge, the lip being breakable for removal and bendable for applications where sheetrock is already in place;
    an electrical outlet box supported by a strap plate cradling the outer tube, the box having a top with non-circular bolt holes, a non-circular top knockout, and side walls having a bottom edge; and
    a support plate attached to the bottom edge of the box walls by carriage bolts, each bolt having a locknut.

2. The hanger of claim 1, wherein the outlet box has an open bottom and the top of the outlet box has at least four non-circular holes carrying carriage bolts, each carriage bolt having a head captured and rigidly held in position by the tube or strap plate for easy attachment of the support plate, a complementary non-circular portion just under the head interfitting the non-circular holes and prohibiting rotary motion of the respective bolts, and a prolonged screw-threaded main body portion extending past the edge of the wall on the outlet box.

3. A hanger for supporting an object by rafters, joists, or wall studs, comprising:
    a pair of freely slidable inner and outer telescope tubes, each tube having an outer end;
    hanger securing means at the outer end of each tube for securing the hanger to two parallel joists;
    an electrical outlet box supported by a strap plate cradling the outer tube, the box having a top with at least four non-circular bolt holes, a non-circular top knockout, side walls, and an open bottom;
    the strap plate being designed to lock bolt heads in position;
    strap securing means for securing the strap to the top of the box with the open bottom facing downward, the strap securing means comprising carriage bolts with nuts in two of the four non-circular bolt holes;
    a support plate for closing off the box and supporting the object, the support plate being attached to the open bottom of the box of carriage bolts, each bolt having a nut;
    support means for raising the hanger above a ceiling or away from wallboard, the support means comprising snap on support stands which are infinitely laterally adjustable along each tube axis; and
    extension means including a threaded rod and nut assembly for allowing manual extension of the tubes and for preventing contraction of the tubes.

4. A hanger for supporting an object by ceiling joists or wall studs, comprising:
    a pair of freely slidable inner and outer telescope tubes, each tube having an outer end;
    hanger securing means at the outer end of each tube for securing the hanger to two parallel joists, studs, or rafters;
    an electrical outlet box supported by a strap plate cradling the outer tube, the box having a top with at least four directly opposed non-circular bolt holes, a non-circular top knockout, opposing side walls, two wall slots in opposing side walls having bottom exterior walls for insertion of a support bracket, and an open bottom,
    the strap plate being a support bracket designed to lock bolt heads in position, the support bracket having flanges with side wings to catch on the bottom exterior walls of the wall slots after insertion;
    strap securing means for securing the strap plate to the top of the box with the open bottom facing downward, the strap securing means comprising carriage bolts and nuts in two of the four directly opposed non-circular bolt holes;
    a support plate attached to the open bottom of the box by carriage bolts, each bolt having a locknut;
    support means for raising the hanger off a ceiling or away from wallboard;
    a spring, buttress nut, and buttress threaded rod assembly;
    retaining means for retaining the tubes and spring in a compressed position; and safety clips intersecting the tubes for retaining the tubes in a collapsed position for shipment and installation.

5. An electrical fixture hanger assembly for mounting an object from a ceiling or wall, comprising:
- a pair of freely slidable inner and outer telescope tubes, each tube having an outer end;
- a pair of end plates transverse to the axis of the tubes and attached to the outer ends of the tubes;
- an electrical outlet box supported by a strap plate cradling the outer tube, the box having a top with at least four non-circular directly opposed bolt holes, a non-circular top knockout, side walls having a bottom edge, and an open bottom facing downward;
- two of the non-circular directly opposed bolt holes having carriage bolts, each bolt having a head that is captured and rigidly held in position by the hanger tubes or strap plate for easy attachment of a support plate, a complementary non-circular portion just under the head interfitting the non-circular holes and prohibiting rotary motion of the respective bolts, and a prolonged screw-threaded main body portion extending past the edge of the wall on the outlet box; and
- a support plate attached to the open bottom of the box at the bottom edge of the walls by carriage bolts, each bolt having a locknut.

6. A hanger for supporting an object by ceiling joists or wall studs, comprising:
- a pair of freely slidably inner and outer telescope tubes, each tube having an outer end;
- hanger securing means at the outer ends of the tubes for securing the hanger to two parallel joists, rafters, or studs;
- an electrical outlet box supported by a strap plate cradling the outer tube, the box having a top with at least four directly opposed non-circular holes, a non-circular top knockout, opposing side walls, wall slots in two of the opposing side walls for insertion of a support bracket, the wall slots having exterior bottom walls, and an open bottom;
- the strap plate being designed to lock bolt heads in position and having flanges with side wings to catch on the exterior bottom walls of the wall slots after insertion;
- strap securing means for securing the strap to the bottom of the box with the open bottom facing downward, the strap securing means comprising carriage bolts in two of the four directly opposed non-circular holes;
- support means for raising the hanger off a ceiling or away from wallboard;
- a spring, buttress nut, and buttress threaded rod assembly;
- retaining means for retaining the tubes and spring in a compressed position; and
- a support plate attached to the open bottom of the box at the bottom edges of the walls by carriage bolts, each bolt having a locknut.

* * * * *